United States Patent [19]

Li

[11] Patent Number: 5,314,103
[45] Date of Patent: May 24, 1994

[54] CONCEALABLE TISSUE BOX HOLDER

[76] Inventor: Kwan-Tao Li, 9F, No. 19, Lane 464, Tun Hua South Road, Taipei, Taiwan

[21] Appl. No.: 929,715
[22] Filed: Aug. 12, 1992
[51] Int. Cl.⁵ .............................................. B60R 7/00
[52] U.S. Cl. .............................. 224/282; 248/231.9; 248/905
[58] Field of Search ............... 248/231.9, 296, 291; 224/282, 0.05

[56] References Cited

U.S. PATENT DOCUMENTS

| 1,243,958 | 10/1917 | McFarland | 224/282 |
| 1,625,011 | 4/1927 | Wolfe et al. | 224/282 |
| 2,278,011 | 3/1942 | Murdock | 248/905 |
| 3,131,813 | 5/1964 | Jensen | 224/282 |
| 4,913,312 | 4/1990 | Boutin | 248/905 |

FOREIGN PATENT DOCUMENTS 801758  1/1951  Fed. Rep. of Germany ...... 224/282

Primary Examiner—Hien H. Phan
Attorney, Agent, or Firm—Ladas & Parry

[57] ABSTRACT

A concealable tissue box holder for use in a car is pivotally mounted on a recess formed on the partition plate between the rear seat and the rear windshield of the car to receive and hold therein a tissue box so that when the tissue paper is not in use, the holder, together with the tissue box, is rotated into the recess to be disposed in a concealed position under the partition plate.

8 Claims, 3 Drawing Sheets

CONCEALABLE TISSUE BOX HOLDER

BACKGROUND OF THE INVENTION

The present invention relates to a tissue box holder, and in particular, to a concealable tissue box holder for use in an automobile, especially a passenger car.

Some of the automobile drivers are used to place tissue papers in their automobiles for the purpose of cleaning their hands, face or the automobile itself. The most common type of tissue paper placed in an automobile is facial tissue in the form of a box. The partition plate between the rear seat and the rear windshield of an automobile is one of the most common places where people place the facial tissue box. The height of the facial tissue box may partially block the eyesight of the driver when the driver views from the inside rear view mirror. Furthermore, the tissue paper partially emerged from the box when withdrawn will increase the blocking range. Sometimes, people use decorative coverage or enclosure to decorate the tissue box to improve the appearance of the interior of the automobile. Very often, the box (with/without decorative coverage or enclosure) is simply placed on the partition plate without any securing means to fix it in position so that when the automobile is in motion, the box may slide on the partition plate in any direction, or it may topple over from the partition plate because of jerky driving.

It is therefore desirable to have a concealable tissue box holder which is pivotally mounted on a recess on the partition plate between the rear seat and the rear windshield of an automobile (especially a passenger car), to locate therein a tissue box so that when the tissues are not in use, the holder together with the tissue box can be rotated into the recess and thus becoming concealed under the partition plate.

SUMMARY OF THE INVENTION

A primary object of the present invention is therefore to provide a concealable tissue box holder for use in an automobile which is rotatable between an open position to allow a user to withdraw tissue paper from a tissue box located inside the tissue box holder and a concealed position to hide the tissue box under the partition plate between the rear seat and the rear windshield of the automobile.

It is another object of the present invention to provide a tissue box holder for use in an automobile which is secured on the partition plate between the rear seat and the rear windshield of the automobile in order to prevent the tissue box held therein from sliding back and forth on the partition plate.

It is a further object of the present invention to provide a tissue box holder for use in an automobile which can be made as a standard car accessory that provides the automobile owner with a device to hold a tissue box, and thus making the decorative coverage or enclosure for the tissue box no longer necessary.

To achieve the above-mentioned object, a concealable tissue box holder is provided. It is pivotally mounted on a recess formed on the partition plate between the rear seat and the rear windshield of an automobile, especially a passenger car, to hold therein a tissue box so that when the tissue paper is not in use, the holder, together with the tissue box, is rotated into the recess to be disposed in a concealed position under the partition plate.

Other objects and advantages of the invention will be apparent from the following description of a preferred embodiment taken in connection with the drawings.

DETAILED DESCRIPTION OF THE INVENTION

Figure 1:
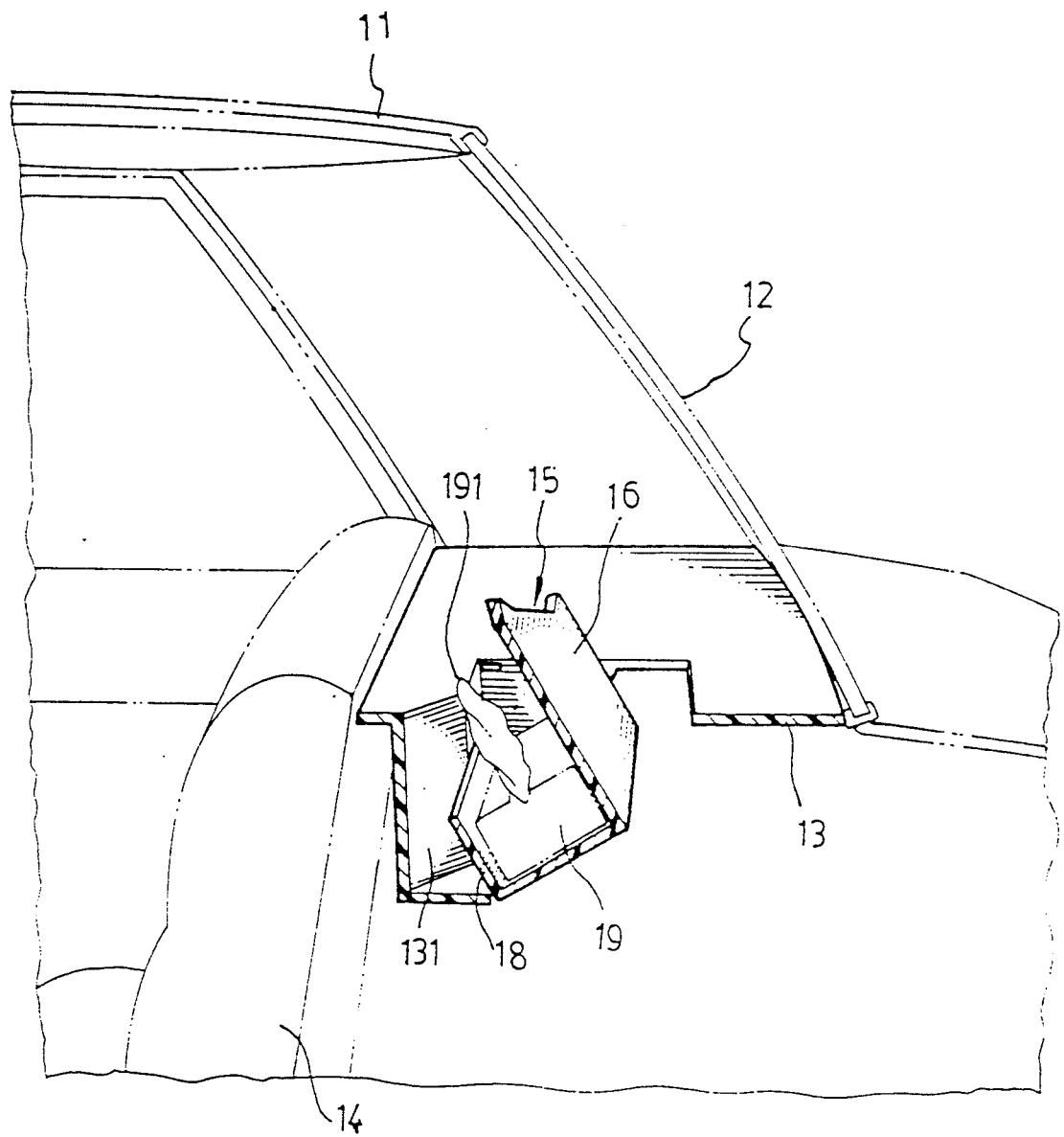
FIG. 1 is a partial cross-sectional view showing a passenger car with a concealable tissue box holder in accordance with the present invention installed on the partition plate between the rear seat and the rear windshield thereof, wherein the tissue box holder is in an open position.
Figure 2:
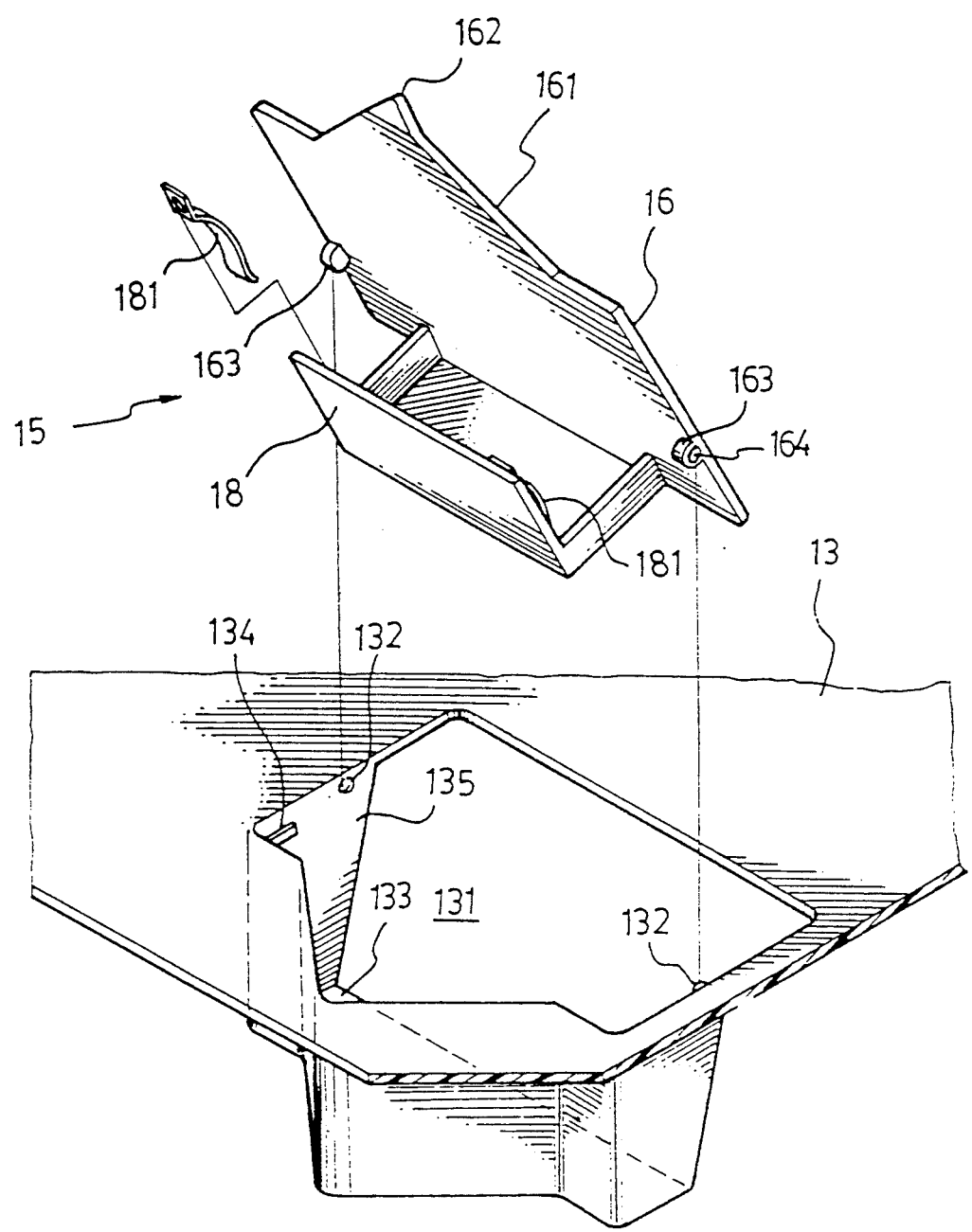
FIG. 2 is an exploded view of the tissue box holder shown in FIG. 1.

With reference to the drawings and in particular FIGS. 1 and 2, a tissue box holder 15 is shown mounted on a partition plate 13 disposed between a rear seat 14 and a rear windshield 12 of an automobile, especially a passenger car 11.

Figure 3:
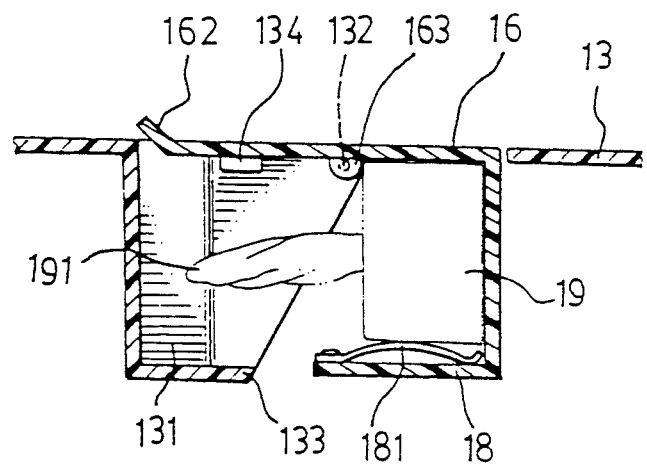
FIG. 3 is a cross-sectional view showing the tissue box holder of the present invention in a concealed position.
Figure 4:
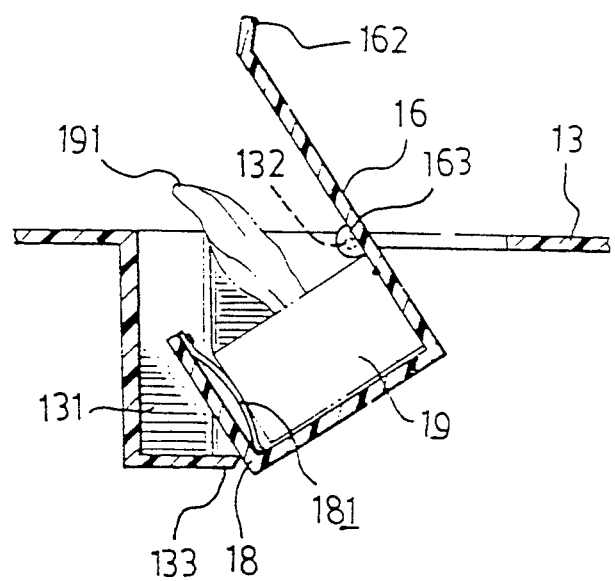
FIG. 4 is a cross-sectional view showing the tissue box holder of the present invention in an open position.

The tissue box holder 15 comprises a holder body 18 with an enlarged surface panel 16 to form substantially an open box to receive therein a tissue box 19 (also see FIGS. 3 and 4). A pair of pin-receiving holes 164 are formed on the surface panel 16. Preferably, each of the pin-receiving holes 164 is formed on a lug portion 163 perpendicularly extending from the surface panel 16.

Resilient securing means, such as at least one leaf spring-like arcuate resilient plate 181, is mounted in the holder body 18 to provide friction with the tissue box 19 so as to hold the tissue box 19 within the holder body 18.

A recess 131 is formed on the partition plate 13 of the car 11, substantially complementary in shape and size to the surface panel 16 so as to be coverable by the surface panel 16. A pair of pin-like pivots 132 are mounted in opposition on the recess 131 in the positions corresponding to the pin-receiving holes 164 of the surface panel 16. The pivots 132 are respectively received in the pin-receiving holes 164 to provide a pivotal engagement between the tissue box holder 15 and the recess 131 so as to make the tissue box holder 15 rotatable with respect to the recess 131 between a concealed position (as shown in FIG. 3) where the tissue box holder 15 is substantially hidden in the recess 131 with the surface panel 16 substantially on the same plane of the partition plate 13 and thus constituting the partition plate 13 in part and an open position (as shown in FIG. 4) where the tissue box holder 15 is rotated to such an inclined position to have the tissue box 19 exposed and thus allowing a user (not shown) to withdraw tissue paper 191 from the tissue box 19.

To support the holder 15 in the concealed position, at least a stop block 134 is formed on a side wall 135 of the recess 131 to retain the surface panel 16 on the plane of the partition plate 13. Similarly, a stop means is provided to stop further rotation of the tissue box holder 15 when the angle of the open position is reached. The stop means may be a bottom edge or a bottom wall 133 of the recess 131 which abuts against the tissue box holder 15 when the open position is reached.

The surface panel 16 may comprise an extension 161, the size of which is large enough to shield the tissue paper 191 which is partially withdrawn from the tissue box 19 to prevent the tissue paper 191 from being contacted by other portion of the automobile. An upward-inclined portion 162 is formed on the extension 161 to allow a finger (not shown) of the user to pull so as to help the opening of the tissue box holder 15.

It is apparent that although the invention has been described in connection with a preferred embodiment, those skilled in the art may make changes to certain features of the preferred embodiment without departing from the spirit and scope of the invention as defined in the appended claims.

I claim:

1. A concealable tissue box holder for use in an automobile comprising a holder body with a surface panel to form a substantially open box for receiving therein a tissue box, said tissue box holder comprising means for pivotally securing said tissue box holder in a recess forced on a partition plate between a rear seat and a rear windshield of the automobile so as to be rotatable with respect to the partition plate between a concealed position where said tissue box holder is in the recess with the surface panel which is substantially complementary in shape and size to the recess covering said recess, and an open position where said tissue box holder is in an inclined position to expose the tissue box; said securing means comprising a pair of pin-like pivots in said recess and a pair of pin-receiving holes on the surface panel of said tissue box holder, said pin-receiving holes receiving the pin-like pivots to provide a pivotal engagement between said tissue box holder and said partition plate; said tissue box holder further comprising resilient securing means to secure the tissue box in the holder body of said tissue box holder.

2. A concealable tissue box holder as claimed in claim 1 further comprising a first stop means formed on a side wall of said recess to retain said tissue box holder in the concealed position.

3. A concealable tissue box holder as claimed in claim 2 wherein said first stop means comprises at least a stop block formed on said side wall of the recess.

4. A concealable tissue box holder as claimed in claim 1 further comprising a second stop means to retain said tissue box holder in the open position.

5. A concealable tissue box holder as claimed in claim 4 wherein said second stop means is a bottom wall of the recess which abuts against the holder body of said tissue box holder when said tissue box holder is rotated to the open position to prevent a further rotation of said tissue box holder.

6. A concealable tissue box holder as claimed in claim 1 wherein said resilient securing means comprises at least one leaf spring-like arcuate resilient member.

7. A concealable tissue box holder as claimed in claim 1 wherein said surface panel comprises an extension to substantially shield the tissue paper which is partially withdrawn from the tissue box.

8. A concealable tissue box holder as claimed in claim 1 wherein said surface panel comprises an upward-inclined portion to allow a finger of a user to pull so as to help opening said tissue box holder from the concealed position to the open position.

* * * * *